United States Patent
Pawlewski et al.

(10) Patent No.: US 6,389,392 B1
(45) Date of Patent: May 14, 2002

(54) METHOD AND APPARATUS FOR SPEAKER RECOGNITION VIA COMPARING AN UNKNOWN INPUT TO REFERENCE DATA

(75) Inventors: Mark Pawlewski, Ipswich; Aladdin Mohammad Ariyaeeinia, St. Albans, both of (GB); Perasiriyan Sivakumaran, Colombo (LK)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/202,026

(22) PCT Filed: Oct. 14, 1998

(86) PCT No.: PCT/GB98/03078

§ 371 Date: Dec. 8, 1998

§ 102(e) Date: Dec. 8, 1998

(87) PCT Pub. No.: WO99/19865

PCT Pub. Date: Apr. 22, 1999

(30) Foreign Application Priority Data

Oct. 15, 1997 (EP) .............................. 97308174

(51) Int. Cl.$^7$ ............................................. G10L 17/00
(52) U.S. Cl. ..................................... 704/241; 704/250
(58) Field of Search ................................ 704/231, 240, 704/239, 241, 246, 248, 250, 200, 251, 252, 247, 254, 255

(56) References Cited

U.S. PATENT DOCUMENTS

| | | | | |
|---|---|---|---|---|
| 4,831,551 A | * | 5/1989 | Schalk et al. | 704/233 |
| 5,025,471 A | * | 6/1991 | Scott et al. | 704/237 |
| 5,167,004 A | * | 11/1992 | Netsch et al. | 704/200 |
| 5,199,077 A | * | 3/1993 | Wilcox et al. | 704/256 |
| 5,509,104 A | * | 4/1996 | Lee et al. | 704/256 |
| 5,649,057 A | * | 7/1997 | Lee et al. | 704/256 |
| 5,651,094 A | * | 7/1997 | Takagi et al. | 704/244 |
| 5,839,103 A | * | 11/1998 | Mammone et al. | 704/232 |

FOREIGN PATENT DOCUMENTS

WO     WO 98/54694      12/1998

OTHER PUBLICATIONS

Matsui et al, "Speaker recognition Using concatenated Phoneme Models", pp. 603–606.
Rosenberg et al, "The Use of Cohort Normalized Scores For Speaker Verification", pp. 599–602.

(List continued on next page.)

Primary Examiner—Richemond Dorvil
(74) Attorney, Agent, or Firm—Nixon & Vanderhye P.C.

(57) ABSTRACT

A method and apparatus for pattern recognition comprising comparing an input signal representing an unknown pattern with reference data representing each of a plurality of pre-defined patterns, at least one of the pre-defined patterns being represented by at least two instances of reference data. Successive segments of the input signal are compared with successive segments of the reference data and comparison results for each successive segment are generated. For each pre-defined pattern having at least two instances of reference data, the comparison results for the closest matching segment of reference data for each segment of the input signal are recorded to produce a composite comparison result for the said pre-defined pattern. The unknown pattern is the identified on the basis of the comparison results. Thus the effect of a mismatch between the input signal and each instance of the reference data is reduced by selecting the best segments from the instances of reference data for each pre-defined pattern.

18 Claims, 9 Drawing Sheets

OTHER PUBLICATIONS

Carey et al, "Speaker Verification Using Connected Words", Proceedings of the Institute of Acoustics, Proc.I.O.A., vol. 14, Part 6 (1992), pp. 95–100.

Jayant, "A Study of Statistical Pattern Verification", IEEE Transactions on Systems, Man, and Cybernetics, vol. SMC–2, No. 2, Apr. 1972, pp. 238–246.

Carey et al, "Speaker Verification", Proceedings of the Institute of Acoustics, Proc.I.O.A., vol. 18, Part 9 (1996).

Gish et al, "A Robust, Segmental Method for Text Independent Speaker Identification", International Conference on Acoustics Speech and Signal Processing—ICASSP94, vol. 1, Apr. 19, 1994, pp. 1–145–1–148.

Liu, "On Creating Averaging Templates", International Conference on Acoustics Speech and Signal Processing—ICASSP84, Mar. 19, 1984, pp. 1–4, XP002049465, New York, USA.

Kobatake, et al, "Degraded Word Recognition Based on Segmental Signal–to–Noise Ratio Weighting", International Conference on Acoustics Speech and Signal Processing—ICASSP94, vol. 1, Apr. 19, 1994, pp. 1–425–1–428.

Matsui et al, "Concatenated Phoneme Models for Text–Variable Speaker Recognition", 1993 IEEE, pp. 11–391–11–394.

* cited by examiner

| | |
|---|---|
| CRM | Combined Reference Model |
| MRM | Multiple Reference Models |
| SMRM | Segmented Multiple Reference Models |
| SWT1 | Segmental Weighting Type 1 |
| SWT2 | Segmental Weighting Type 2 |

| | |
|---|---|
| MRM | Multiple Reference Models |
| SMRM | Segmented Multiple Reference Models |
| SWT1 | Segmental Weighting Type 1 |
| SWT2 | Segmental Weighting Type 2 |

METHOD AND APPARATUS FOR SPEAKER RECOGNITION VIA COMPARING AN UNKNOWN INPUT TO REFERENCE DATA

BACKGROUND OF THE INVENTION

1. Field of the Invention

This invention relates to automatic pattern recognition in which an unknown input is compared to reference data representative of allowed patterns and the unknown input is identified as the most likely reference pattern.

2. Description of Related Art

Reference data for each member of a set of allowed patterns is stored and a test input compared with the reference data to recognise the input pattern. An important factor to consider in automatic pattern recognition is that of undesired variations in characteristics, for instance in speech or handwriting due to time-localised anomalous events. The anomalies can have different forms such as the communication channel, environmental noise, uncharacteristic sounds from speakers, unmodelled writing conditions etc. The resultant variations cause a mismatch between the corresponding test and reference patterns which in turn can lead to a significant reduction in the recognition accuracy.

The invention has particular, although not exclusive, application to automatic speaker recognition. Speaker recognition covers both the task of speaker identification and speaker verification. In the former case, the task is to identify an unknown speaker as one from a pre-determined set of speakers; in the latter case, the task is to verify that a person is the person they claim to be, again from a pre-determined set of speakers. Hereinafter reference will be made to the field of speaker recognition but the technique is applicable to other fields of pattern recognition.

To improve robustness in automatic speaker recognition, a reference model is usually based on a number of repetitions of the training utterance recorded in multiple sessions. The aim is to increase the possibility of capturing the recording conditions and speaking behaviour which are close to those of the testing through at least one of the utterance repetitions in the training set. The enrolled speaker may then be represented using a single reference model formed by combining the given training utterance repetitions. A potential disadvantage of the above approach is that a training utterance repetition which is very different from the test utterance may corrupt the combined model and hence seriously affect the verification performance. An alternative method is to represent each registered speaker using multiple reference models. However, since the level of mismatch normally varies across the utterance, the improvement achieved in this way may not be significant.

The methods developed previously for introducing robustness into the speaker verification operation have been mainly based on the normalisation of verification scores. The development of these methods has been a direct result of the probabilistic modelling of speakers as described in the article by M. J. Carey and E. S. Parris, "Speaker Verification", Proceedings of the Institute of Acoustics (UK), vol. 18, pp. 99–106, 1996 and an article by N. S. Jayant, "A Study of Statistical Pattern Verification", IEEE Transaction on Systems, Man, and Cybernetics, vol. SMC-2, pp. 238–246, 1972. By adopting this method of modelling and using Bayes theorem, the verification score can be expressed as a likelihood ratio. i.e.

$$\text{Verification Score} = \frac{\text{likelihood (score) for the target speaker}}{\text{likelihood (score) for any speaker}}$$

The above expression can be viewed as obtaining the verification score by normalising the score for the target speaker.

A well known normalisation method is that based on the use of a general (speaker-independent) reference model formed by using utterances from a large population of speakers M. J. Carey and E. S. Parris, "Speaker Verification Using Connected Words", Proceedings of the Institute of Acoustics (UK), vol. 14, pp. 95–100, 1992. In this method, the score for the general model is used for normalising the score for the target speaker. Another effective method in this category involves calculating a statistic of scores for a cohort of speakers, and using this to normalise the score for the target speaker as described in A. E. Rosenberg, J. Delong, C. H. Lee, B. H. Huang, and F. K. Soong, "The Use of Cohort Normalised Scores for Speaker Verification", Proc. ICSLP, pp. 599–602, 1992 and an article by T. Matsui and S. Furui, "Concatenated Phoneme Models for Text-Variable Speaker Recognition", Proc. ICASSP, pp. 391–394, 1993. The normalisation methods essentially operate on the assumption that the mismatch is uniform across the given utterance. Based on this assumption, first, the score for the target speaker is calculated using the complete utterance. Then this score is scaled by a certain factor depending on the particular method used.

The invention seeks to reduce the adverse effects of variation in patterns.

In accordance with the invention there is provided a method of pattern recognition.

Thus the invention relies on representing allowed patterns using segmented multiple reference models and minimising the mismatch between the test and reference patterns. This is achieved by using the best segments from the collection of models for each pattern to form a complete reference template.

Preferably the mismatch associated with each individual segment is then estimated and this information is then used to compute a weighting factor for correcting each segmental distance prior to the calculation of the final distance.

BRIEF DESCRIPTION OF THE DRAWINGS

The invention will now be described, by way of example only, with reference to the accompanying drawings in which:

FIG. 1 shows a first embodiment of speaker recognition apparatus according to the invention;

FIG. 2 shows the elements of a feature extractor for use in the speaker recognition apparatus shown in FIG. 1;

FIG. 3 shows an example of the reference data store of the apparatus shown in FIG. 1;

FIG. 4 is a graph showing the distances between three training utterances and one test utterance;

FIG. 5 shows the effect of the segment size on speaker verification performance;

FIG. 6 shows a second embodiment of the invention;

FIG. 7 shows a third embodiment of the invention;

FIG. 8 is a chart showing the experimental results comparing the performance of three embodiments of the invention and two prior art techniques for a single digit utterance;

FIG. 9 is a chart showing the experimental results comparing the performance of three embodiments of the invention and two prior art techniques for a ten digit utterance;

Figure 10:
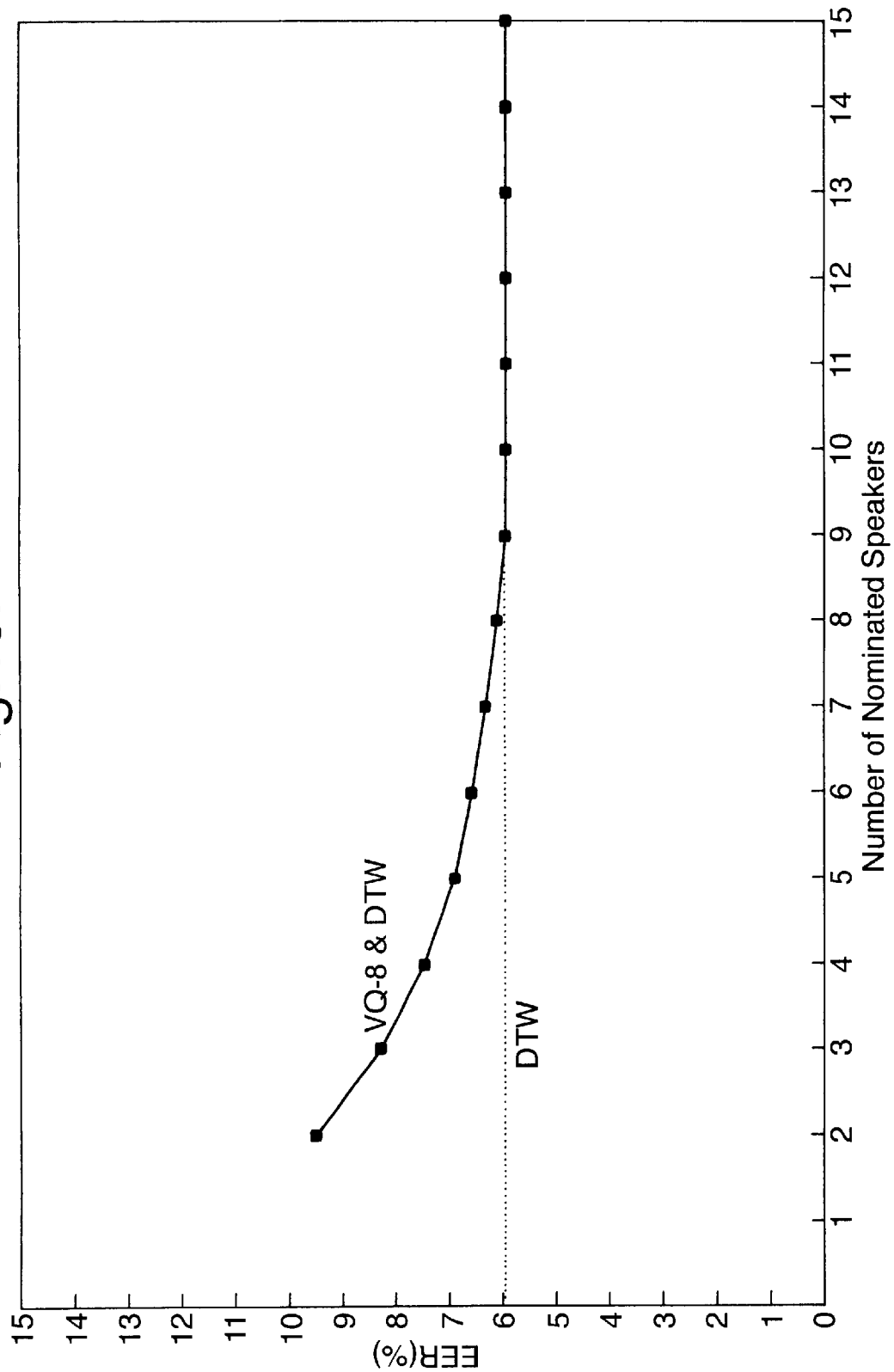

FIG. 10 is a graph showing the Equal Error Rate (EER) as a function of the number of competing speakers.

DETAILED DESCRIPTION OF PREFERRED EMBODIMENTS

Pattern recognition apparatus generally operates in two modes: training and test. In the training mode, reference models are formed from the utterances of an allowed speaker. These reference models are then stored for subsequent use in speaker recognition, a test utterance from an unknown speaker being compared with the reference model for the claimed speaker (for verification) or with all the reference models for all the allowed speakers (for identification) and the comparison results being used to determined if the speaker is the or an allowed speaker.

The embodiments described herein are based on the use of a dynamic time warping (DTW) algorithm, and each allowed speaker is re presented using linearly segmented multiple reference models. Each reference model is formed using a single utterance repetition.

The invention involves evaluating the relative dissimilarities (or similarities) between each segment of a given test utterance and the corresponding segments in the collection of reference models (or reference data) for each registered speaker or, in the case of verification, the claimed speaker. The best individual reference segments for each targeted speaker are then selected to form a complete model for the purpose of identification/verification. All the reference models for a given utterance text are of the same length. To achieve this, the length of each template is made equal, in the training phase, to the mean length of all the available templates for the given text, by a linear decimation-interpolation technique for instance as described in C. S. Myers, L. R. Rabiner, and A. E. Rosenberg, "Performance trade-offs in dynamic time warping algorithms for isolated word recognition", IEEE Transaction on Acoustics, Speech, and Signal Processing, Vol. ASSP-28, pp. 622–733, Dec. 1980. This process may be repeated during recognition trials to ensure that, for each given utterance text, the test and reference templates have the same duration.

Figure 1:
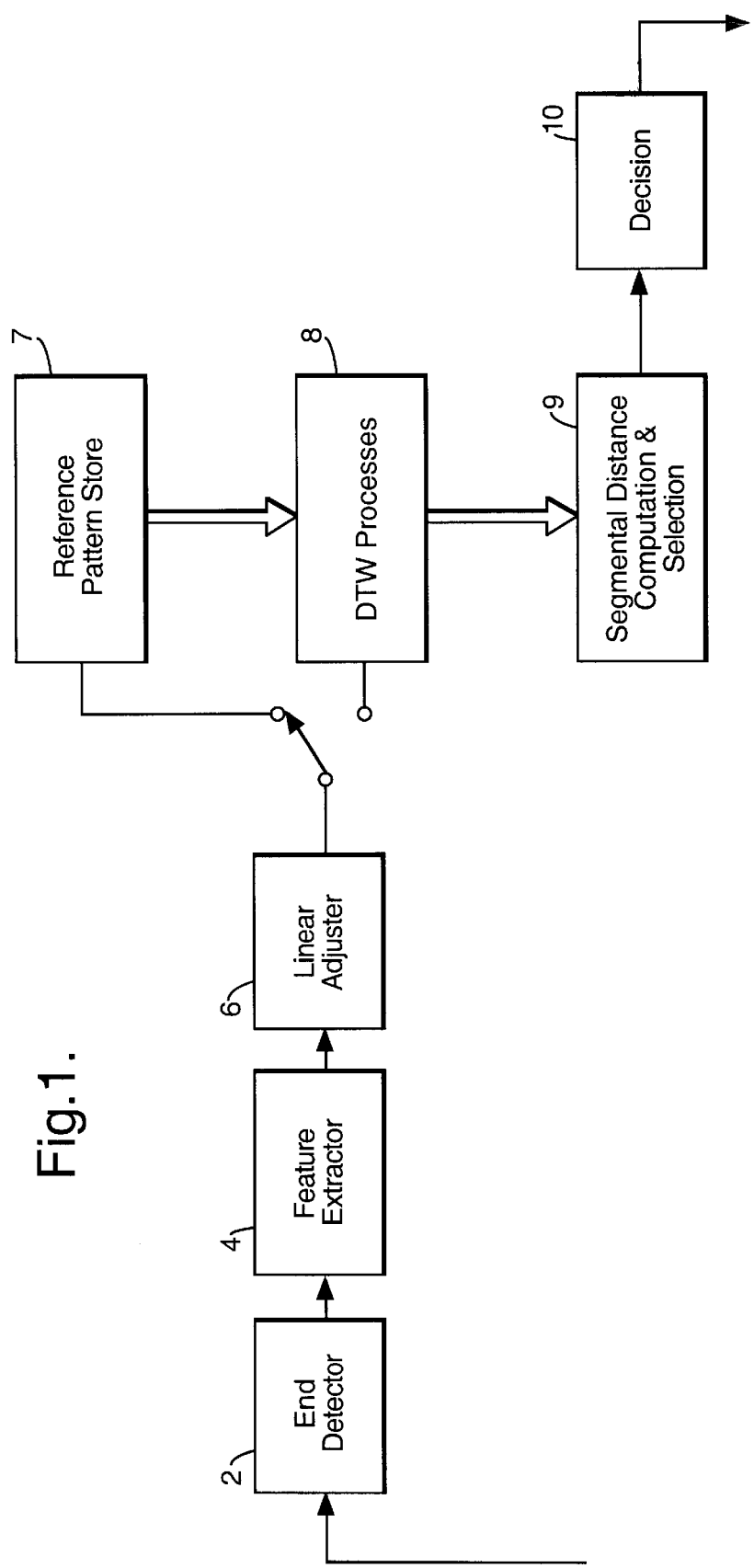

A first embodiment of the invention is shown in FIG. 1. Speaker recognition apparatus comprises an end-point detector 2 for detecting the start and end of an utterance in a received signal. Any suitable end-point detector may be used such as that described in "An Improved Endpoint Detector for Isolated Word Recognition" by L. F. Lamel, L. R. Rabiner, A. E. Rosenberg and J. C. Wilpon *IEEE transactions on Acoustics, Speech, and Signal Processing*, Vol. ASSP-29, No. 4, pp. 777–785, Aug. 1981 or "An Improved Word-Detection Algorithm for Telephone-Quality Speech Incorporating Both Semantic Constraints", by J. C. Wilpon, L. F. Lamel, L. R. Rabiner and T. Martin *AT&T Bell Laboratories Technical Journal*, Vol. 63, No. 3, pp. 479–497, Mar. 1984.

Figure 2:
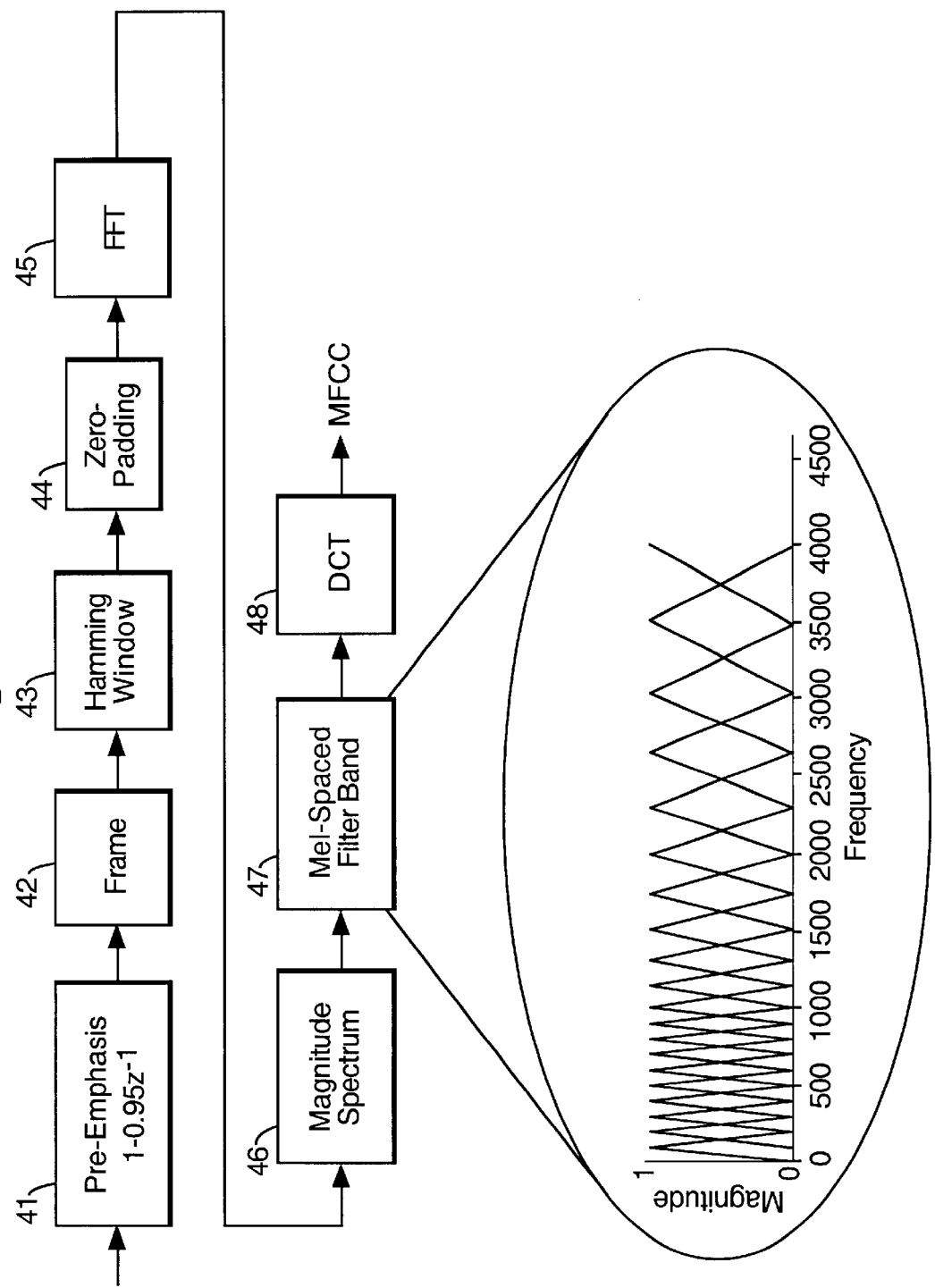

Once the start of an utterance has been detected, the signal is passed to a feature extractor 4 which generates, for each frame, a feature vector of Mel Frequency Cepstum Coefficients (MFCCs) from the received signal. To this end, as shown in FIG. 2, the digitised speech is first pre-emphasised (41) using a simple first order digital network and then blocked into frames (42) of 200 samples with consecutive frames overlapping by 100 samples. Each speech frame is windowed (43) by a 200-sample Hamming window and then extended to 1024-point by padding it (44) with zeros at the end. The magnitude spectrum (46), which is obtained via a $10^{th}$ order FFT (45), is passed through a bank of 20 mel-spaced triangular bandpass filters (47) (the centre frequency of the first ten filters being linearly spaced up to 1 kHz and the remaining ten being logarithmically spaced) which simulate the critical band filtering. The log-energy output of the filterbank is transformed using a Discrete Cosine Transform (DCT) (48) to give the FFT-MFCC coefficients. Although this process produces 1024 coefficients, only the first 12 are used for the purpose of the invention. Other or additional co-efficients may be generated as required e.g. LPC-MFCCs.

The MFCCs are then input to a linear length adjustment unit 6 as shown in FIG. 1. In unit 6, the length of the input vector sequence (M frames) is adjusted to a predetermined length (N frames) by using a linear interpolation method. The modified feature vectors resulting from this process can be expressed as:

$$\tilde{X}_{\tilde{m}} = (1-\alpha)X_m + \alpha X_{m+1} \quad \tilde{m} = 1, 2, \ldots, N$$

where, $x_m$ is the $m^{th}$ original feature vector $$m = \left\lfloor (\tilde{m} - 1)\frac{(M-1)}{(N-1)} + 1 \right\rfloor,$$

and $\lfloor \zeta \rfloor$ denotes the greatest integer less than or equal to $\zeta$ and $$\alpha = (\tilde{m} - 1)\frac{(M-1)}{(N-1)} + 1 - m,$$

Figure 3:
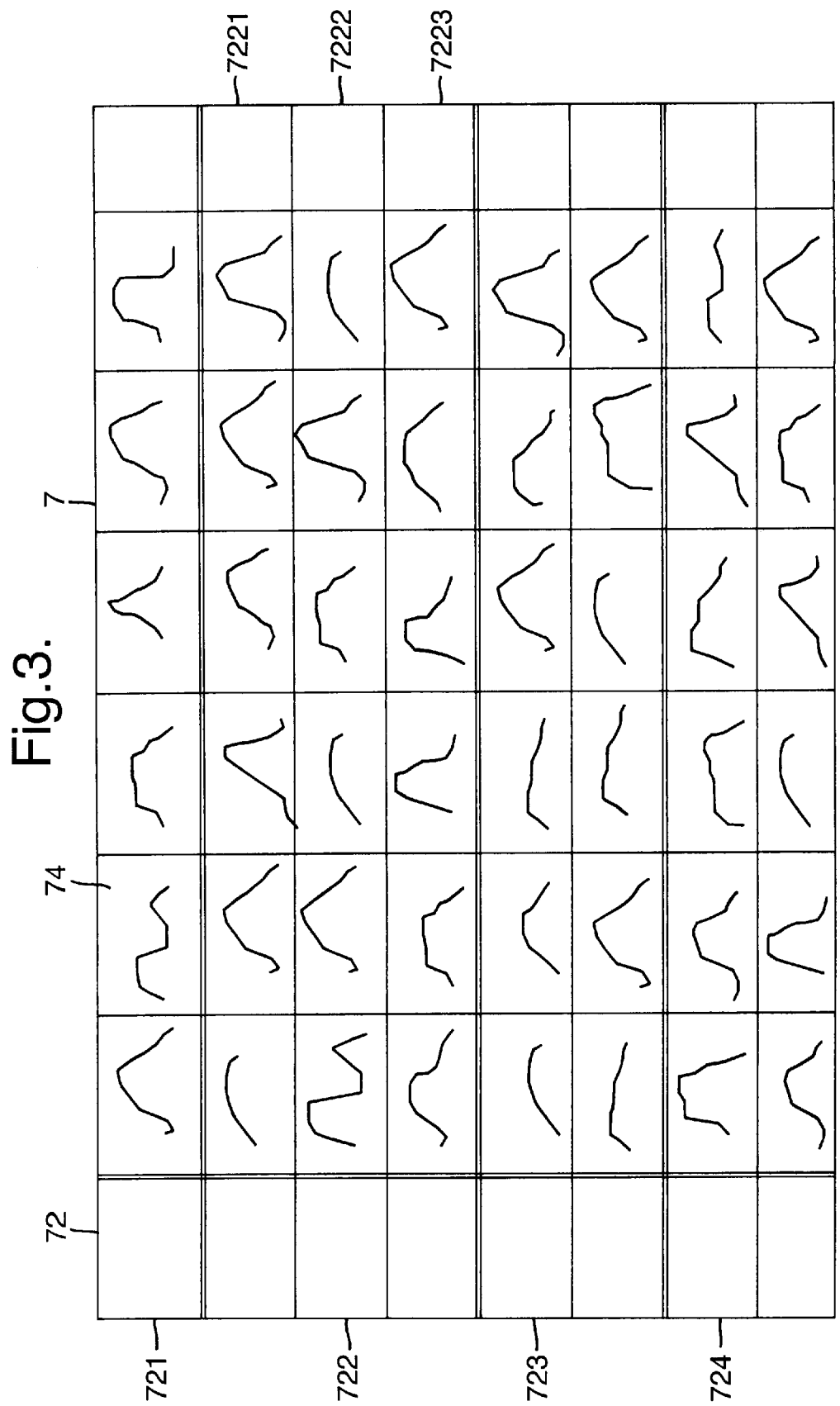

In the training mode, the linearly adjusted MFCCs are stored in a reference data store 7. As shown in FIG. 3, the reference data store 7 comprises a field 72 for storing an identifier of a pattern. For instance the reference data stored in the store 7 represents utterances of the same speech (e.g. a identification phrase) from four speakers 721, 722, 723 and 724. Only one instance of an utterance of the phrase by speaker 721 is stored; three instances 7221, 7222 and 7223 of an utterance of the phrase by speaker 722 are stored; two instances of an utterance of the phrase by speaker 723 are stored; and two instances of an utterance of the phrase by speaker 724 are stored. Each field 74 represents the linearly adjusted MFCCs generated for a frame of the training utterance. If the reference data represents the same utterance from each allowed speaker, the reference data is linearly adjusted such that the number of frames in each instance of reference data is equal to the mean number of samples for all the reference data. If the reference data represents different utterances for each allowed speaker, the reference data is linearly adjusted such that the number of frames in each instance of reference data is equal to the mean number of frames for the reference data for that allowed user.

In the test mode the linearly adjusted feature vector sequence is passed to the unit 8 where a set of DTWs are performed between the test utterance and the reference data. The DTW algorithm used in this work is similar to the one described in S. Furui, "Cepstral Analysis Technique for Automatic Speaker Verification," *IEEE Trans. on Acoustics, Speech and Signal Processing*, Vol. ASSP-29, pp. 254–272, Apr. 1981, and consists of three steps:

Step 1: Initialsation: From m=1 to 1+δ=>$D_A$(1,m)=d'(1, m)

Step 2: Main Recursion: From n=2 to N and for all m

If the point (m,n) satisfies the constraint $M_L(n) \leq m \leq M_H(n)$ then $D_A(n,m) = d'(n,m) + \min\{D_A(n-1,m)g(n-1,m), D_A(n-1,m-1), D_A(n-1,m-2)\}$ $$P(n, m) = \operatorname*{arg\,min}_{[m,m-1,m-2]} \{D_A(n-1,m)g(n-1,m)D_A(n-1,m-1), D_A(n-1,m-2)\}$$

Step 3: Termination:

$$D = \min_{N-\delta \leq M_S \leq N} [D_A(N, M_S)/N] \text{ and}$$

$$M^* = \operatorname*{arg\,min}_{N-\delta \leq M_S \leq N} [D_A(N, M_S)/N]$$

In the above procedure δ is the maximum anticipated range of mismatch (in frames) between boundary points of the considered utterance, d'(n,m) is a weighted Euclidean distance between the $n^{th}$ reference frame and $m^{th}$ test frame and $M_L(n)$ and $M_H(n)$ are the lower and upper boundaries of the global constraint respectively and have the forms:

$M_L(n)=\max\{0.5n, (2n-N-\delta), 1\}$, $M_H(n)=\min\{(2n+\delta-1), 0.5(N+n), N\}$.

and g(m) is a non-linear weight which is given as:

$$g(n, m) = \begin{cases} \infty & \text{if } D_A(n-1, m) = \min\{D_A(n-1, m), \\ & D_A(n-1, m-1), D_A(n-1, m-2)\} \\ 0 & \text{otherwise} \end{cases}$$

The unit 9 involves the following backtrack procedure to obtain the frame level distances d(n), n=1... N which form the global distance D:
m=M*
From n=N to 1
  d(n)=d'(n,m)
  m=P(n,m)
For each allowed speaker, the smallest d(n) for a given segment (or frame) of this received signal is used to determine the optimum path. The output d(n) of the unit 9 is input to a decision unit 10 which determines the most likely speaker to be recognised.

In speaker verification, the test utterance is compared with the reference models for the claimed speaker. The claimed identity of the speaker is obtained via an input from the claimed user. This input may be in the form of spoken digits, DTMF signals, a swipe of a magnetic strip on a card or by any other suitable means to convey data to the speaker recognition apparatus. Once the claimed identity of a speaker has been obtained, the reference models for that claimed speaker are used to determine whether the speaker is the claimed speaker.

Figure 4:
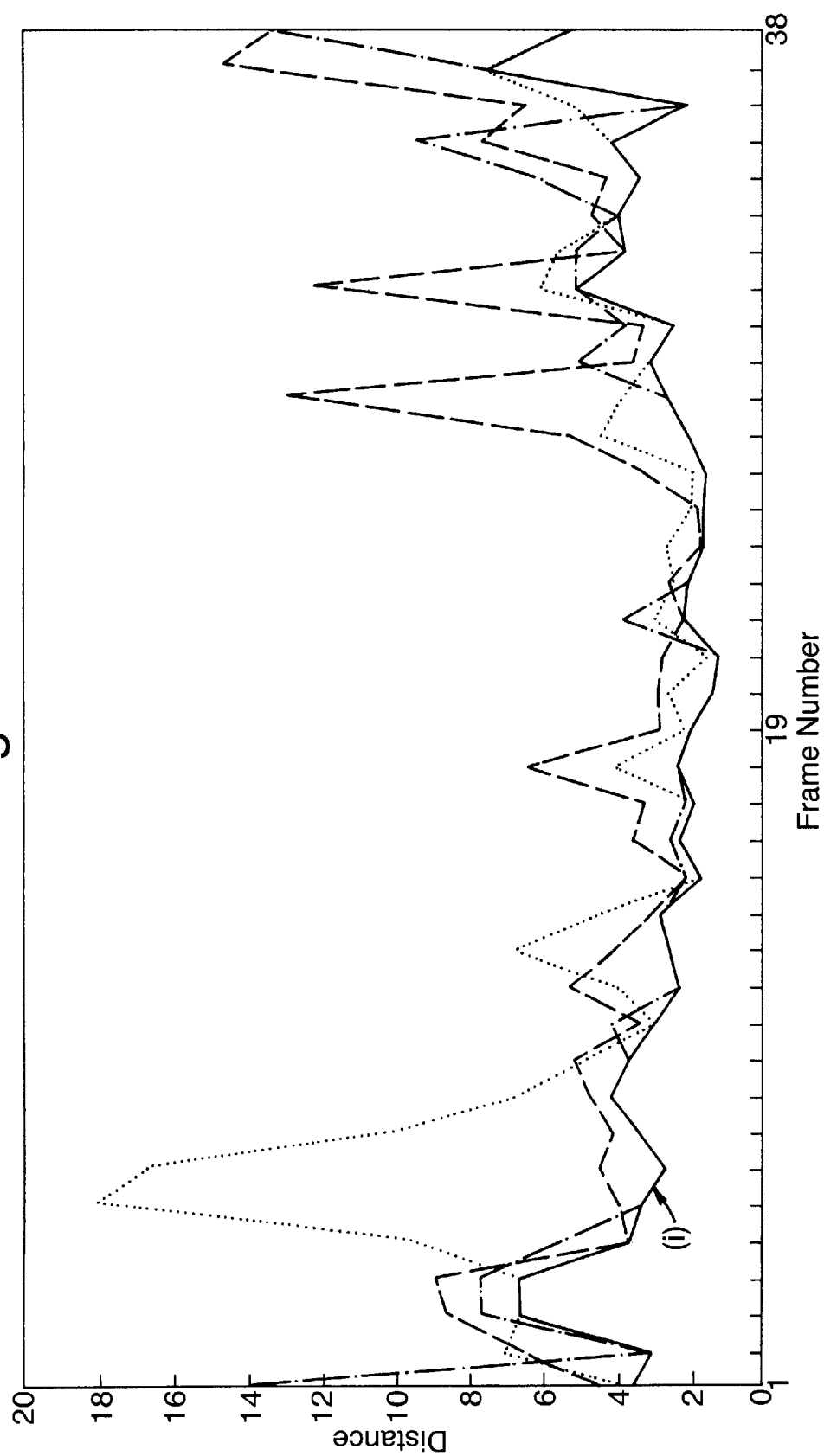

FIG. 4 is a graph showing the distances d(n) between each of three training utterances and a test utterance of a digit spoken by the same speaker. An examination of this figure clearly shows that the relative closeness of the reference data to the test data varies considerably and irregularly across the length of the utterance. By partitioning the utterance into shorter segments, a set of reference segments (from the given data for a given user) with the minimum distances from their corresponding test segments is selected. An important issue to consider in this approach is the size of the segments. Based on the graphs in FIG. 4, it can be argued that in order to minimise the overall distance, the segments should have the shortest possible length. DTW is one technique which provides the possibility of reducing the segment size to that covering only a single frame. This is because in DTW a state represents a frame of the training utterance. The overall distance for a given speaker can be obtained as the average of distances between the test utterance frames and the best corresponding frames in the reference set of the given allowed speaker. A trace of these distances is shown in FIG. 4, labelled (i).

Figure 5:
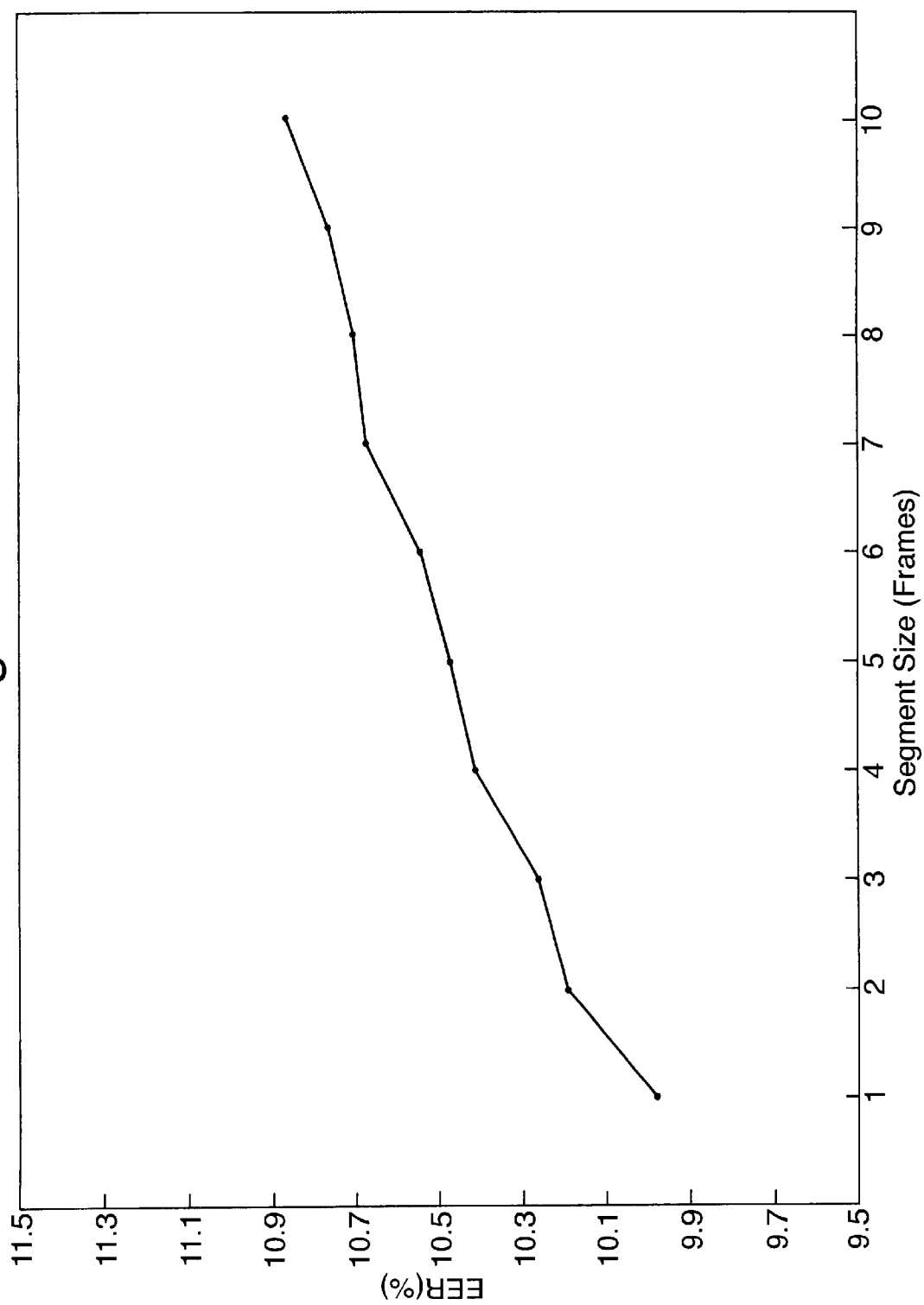

FIG. 5 illustrates the effect of the segment size on the speaker verification performance. It is observed that the equal error rate (EER) increases almost linearly from 9.98% to 10.86% as the segment size is increased from one to ten frames. These results confirm the earlier suggestion that the approach performs best when the segments are of single frame size.

Figure 6:
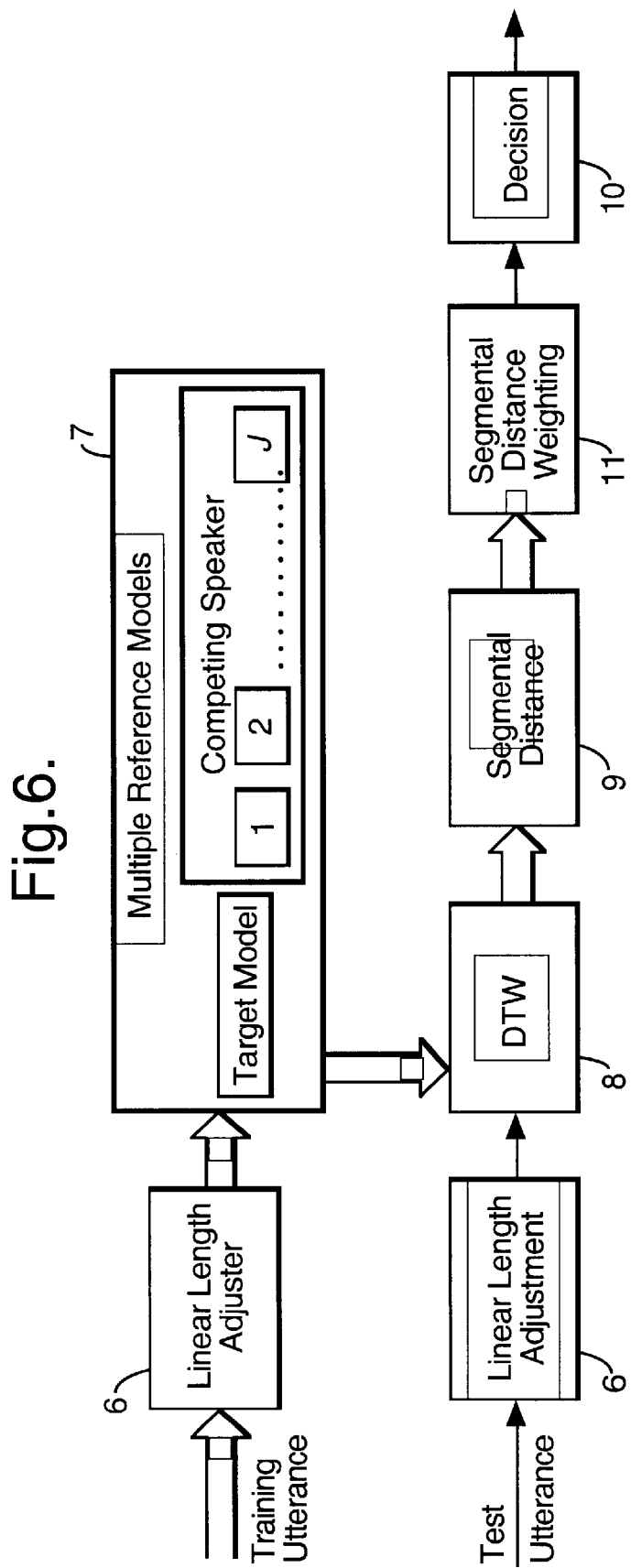

FIG. 6 shows a second embodiment of the invention in which elements common to FIG. 1 are indicated by like numerals. This second embodiment seeks to reduce further the effects of any existing mismatch between the test utterance and the generated best reference model. This is achieved by weighting each segmental distance in accordance with the estimated level of mismatch associated with that segment. The overall distance is then computed as the average of these weighted segmental distances. i.e.

$$D = \frac{1}{N} \sum_{n=1}^{N} w(n)d(n) \tag{1}$$

where N is the adjusted number of frames in the given utterance, w(n) is the weighting factor for the $n^{th}$ segmental distance, and d(n) is the distance between the $n^{th}$ test frame and the corresponding frame n in the generated best reference model.

The dependence of the weighting factor w(n) on the segment index, as given in the above equation, provides the possibility of correcting each segmental distance in accordance with the associated level of mismatch. In order to determine these weighting factors, use can be made of a set of J speaker models that are capable of competing with the target model. In this case it can be argued that if, due to certain anomalies, there is some degree of mismatch between a segment of the test utterance (produced by the true speaker) and the corresponding segment of the target model, then a similar level of mismatch should exist between that test utterance segment and the corresponding segments of the competing reference models. Based on this argument an effective weighting function can be defined as:

$$w(n) = \left( \left[ \frac{1}{J} \sum_{j=1}^{J} d'_j(n) \right] \right)^{-1} \tag{2}$$

where J is the number of speakers in the selected competing set, and $d_j(n)$ are the distances between the $n^{th}$ segment of the test utterance and corresponding segments of the competing models. Equations (1) and (2) indicate that any segmental distance affected due to an undesired mismatch is appropriately scaled prior to the calculation of the overall distance. FIG. 6 illustrates the operations involved in this approach.

The identity of the unknown speaker is recognised or verified on the basis of the comparison i.e. the value of D will determine whether the unknown speaker is identified. The threshold value for D is determined a posteriori for each allowed speaker to result in the equal error rate (EER) for the speaker. Alternatively the threshold is determined a priori using statistical methods, for instance as described by J. P. Campbell "Features and Measures for Speaker Recognition" PhD Thesis, Oklahoma State University, USA, 1992

The competing model may be a conventional generic speech model which models speech rather than particular speakers. Alternatively, the competing speaker models can be pre-selected based on their closeness to the target model. In Examples A to C below, the J competing models are pre-defined for each allowed speaker in dependence on the similarities between the reference data for a given allowed user and the reference data for some or all of the remaining allowed users i.e. the J competing models for a particular speaker are those for which the reference data is most similar to the reference data for the particular speaker. Refer to equation 1 for the following examples.

EXAMPLE (A)

Assumptions:

the test utterance is produced by a true speaker there are five segments (frames) in each utterance $d(n)=2, 3, 1, 5, 2$ $w(n)=1/3, 1/4, 1/3, 1/7, 1/4$ $N=5$ therefore $D=(1/5)\{2/3+3/4+1/3+5/7+2/4\}=0.59285$ In the above example the test utterance produced by the true speaker is more similar to the target model than the competing model.

EXAMPLE (B)

Assumptions:

the test utterance is produced by an impostor

Again $N=5$ $d(n)=8, 10, 7, 9, 8$ $w(n)=1/6, 1/5, 1/4, 1/3, 1/2$

Therefore $D=(1/5)\{8/6+10/5+7/4+9/3+8/2\}=2.4166$

A large distance compared to case (A). Therefore the claimant is rejected.

EXAMPLE (C)

Assumptions:

the test utterance is spoken by an impostor $N=5$ the test utterance is either almost equally dissimilar from the target model and the competing model or, is more dissimilar from the competing model than the target model.

$d(n)=8, 10, 7, 9, 8$ $w(n)=1/9, 1/11, 1/10, 1/12, 1/10$ therefore $D=(1/5)\{8/9+10/11+7/10+9/12+8/10\}=0.6318118$ The distance is very low and close to that produced in case (A).

A disadvantage of the above method of selecting J competing speakers is that, if an impostor produces a test utterance which is almost equally dissimilar from the target model and the competing models (example (C) above), then the approach may lead to a small overall distance, and hence the impostor may be accepted as the true speaker. This is simply because, in this case, the large segmental distances given by d(n,m) are almost cancelled out by the small values of w(n).

Figure 7:
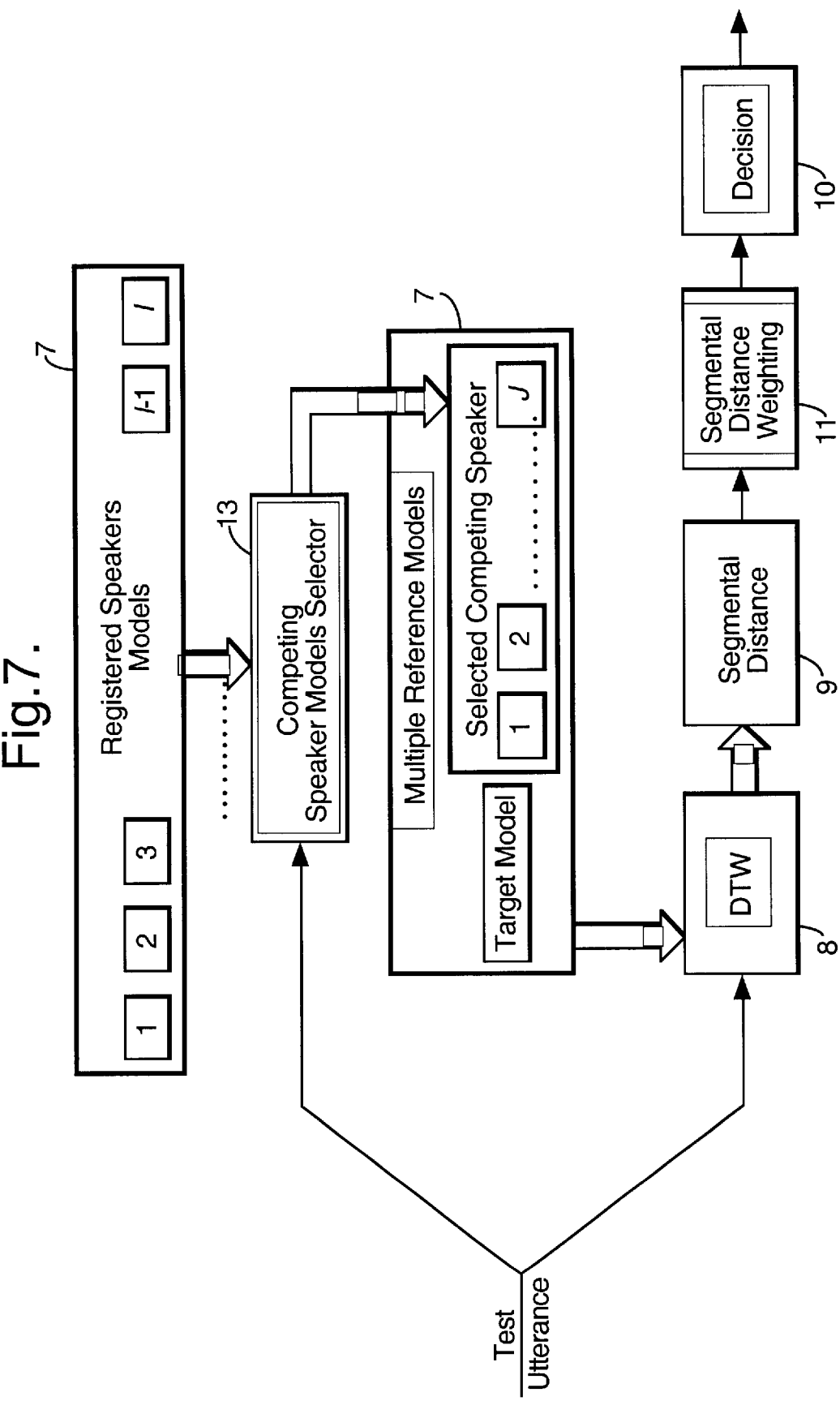

To overcome the above problem the competing speaker models may be based on their closeness to the given test input. With this method, when the test utterance is produced by the true speaker, the J competing speaker models can be assumed to be adequately close to the true speaker reference model. Therefore the method can be expected to be almost as effective as the previous approach. However, in the case of the test utterance being produced by an impostor, the competing speaker models will be similar to the test template and not necessarily to the target model. As a result d(n,m) and w(n) will both become large and the probability of false acceptance will be reduced significantly. This method of robust speaker verification is summarised in FIG. 7. For the purpose of this description the above two methods involving weighting are referred to as segmental weighting type 1 (SWT1) and segmental weighting type 2 (SWT2) respectively.

Examples for SWT2

EXAMPLE (D)

When the test utterance is produced by a true speaker, the example is similar to the example (A) given above for SWT1.

EXAMPLE (E)

When the test utterance is produced by an impostor it is more dissimilar from the target model than from the competing model. This is because the competing model is selected based on its closeness to the test utterance.

$N=5$ $d(n)=7, 9, 6, 10, 11$ $(1/w(n))=3, 1, 2, 4, 2$ therefore $D(n)=(1/5)\{7/3+9/1+6/2+10/4+11/2\}=4.460$ Therefore SWT2 is more effective than SWT1 in reducing false acceptance (for a given verification threshold).

The speech data used in the experimental study was a subset of a database consisting of 47 repetitions of isolated digit utterances 1 to 9 and zero. The subset was collected from telephone calls made from various locations by 11 male and 9 female speakers. For each speaker, the first 3 utterance repetitions (recorded in a single call) formed the training set. The remaining 44 repetitions (1 recorded per week) were used for testing.

The utterances, which had a sample rate of 8 kHz and a bandwidth of 3.1 kHz, were pre-emphasised using a first order digital filter. These were segmented using a 25 ms Hamming window shifted every 12.5 ms, and then subjected to a $12^{th}$-order linear prediction analysis. The resultant linear predictive coding (LPC) parameters for each frame were appropriately analysed using a $10^{th}$-order fast Fourier transform, a filter bank, and a discrete cosine transform to extract a $12^{th}$-order mel-frequency cepstral feature vector [2,8,9]. The filter bank used for this purpose consisted of 20 filters. The centre frequencies of the first 10 filters were linearly spaced up to 1 kHz, and the other 10 were logarithmically spaced over the remaining frequency range (up to 4 kHz).

In order to minimise the performance degradation due to the linear filtering effect of the telephone channel, a cepstral mean normalisation approach was adopted. The technique involved computing the average cepstral feature vector across the whole utterance, and then subtracting this from individual feature vectors.

Figure 8:
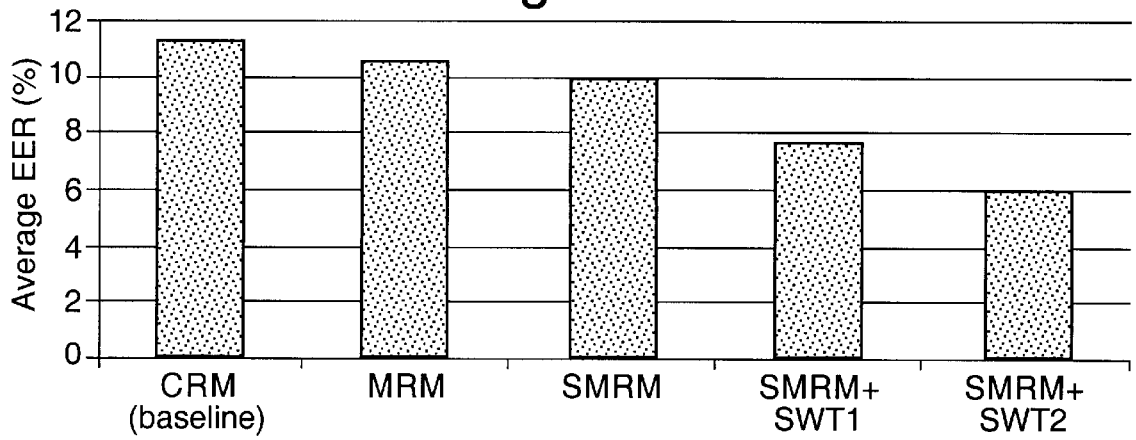

The effectiveness of the above methods was examined through a set of experiments. The results of this investigation are presented in FIG. 8. It is observed that by using the proposed methods the error in verification can be significantly reduced.

Figure 9:
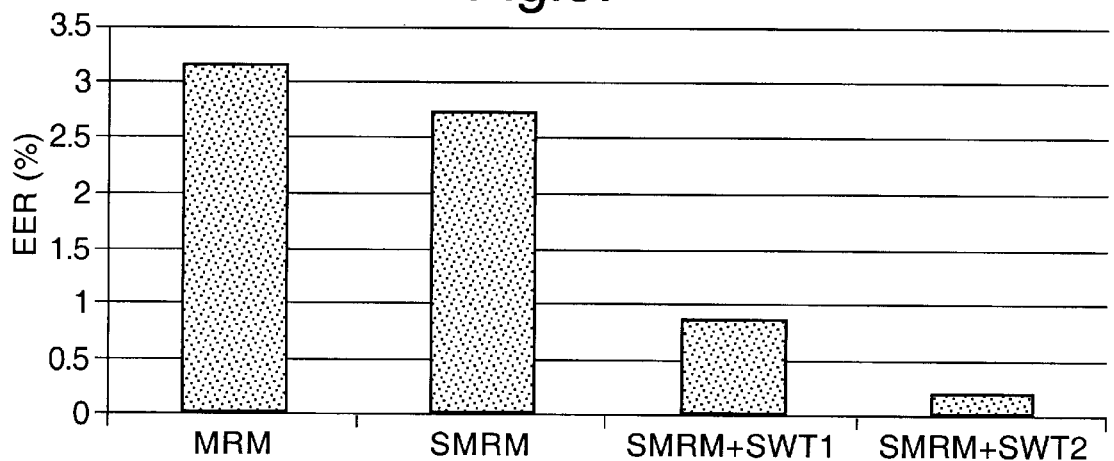

The relative effectiveness of the multiple reference model-based methods is also examined in experiments using a sequence of ten digits. Results of this study (FIG. 9) again confirm that the use of segmental weighting leads to a considerable improvement in speaker verification.

The main drawback of SWT2 is its computational complexity owing to the large number of DTW-based comparisons to be carried out to select the competing speakers. This problem can, to a certain extent, be overcome by selecting the competing speakers through a method which is computationally more efficient. The DTW technique may then be used for the subsequent parts of the operation. It should be noted that the technique used to replace DTW for selecting competing speakers may not be as efficient. It is therefore possible that the selected competing speakers are different from those that should, and would, be obtained with DTW. An alternative approach would be to use a computationally efficient method to select a larger-than-required number of competing speaker models and then reduce this using DTW.

To investigate this idea, a vector quantisation (VQ) algorithm with a codebook of size 8 was used for nominating competing speakers from the set of registered speakers during each verification trial. The required number of competing speakers was set to 2 and the selection of these from the group of nominees was based on the use of DTW. The speaker verification trials were performed by incrementing the number of nominated competing speakers from 2 to 15. FIG. 10 shows the results of this study in terms of the equal error rate as a function of the number of nominated competing speakers. This figure also shows the EER obtained using the original form of SWT2 in which the two competing speakers are selected using the DTW approach. It should be pointed out that, when only two speakers are nominated by the VQ approach, these will essentially be considered as the selected competing speakers. In this case, since DTW is not used in selecting the competing speakers, the computational efficiency of the method is maximised. However, as seen in FIG. 10, the associated EER is considerably higher (over 3%) than that for the original SWT2. As the number of nominees exceeds the required number of competing speakers, the computational efficiency of the approach reduces. This is because DTW has to be used to make the final selection from an increasing number of nominated speakers. This, on the other hand, results in a reduction in the verification error. It is observed in FIG. 10 that as the number of speakers nominated by VQ reaches 9, the resultant EER becomes exactly equal to that of the original SWT2 method. This clearly indicates that the top two competing speakers are amongst the group of nominees. In this case, since DTW is applied to less than half the speaker models in the set, the computational efficiency of the approach is considerably improved without any loss in the verification accuracy.

To compare the performance of the invention with that of known normalisation methods, experiments were conducted using SWT2 and unconstrained cohort normalisation (UCN) which is a comparable normalisation technique as described in an article by A. M. Ariyaeeinia and P. Sivakumaran, "Speaker Verification in Telephony", *Proceedings of the Institute of Acoustics* (UK), Vol. 18, pp. 399–408, 1996.

Results of these experiments, which were based on using single digits as well as a sequence of ten digits, are presented in Table 1. It is observed that in both cases there is a considerable difference in performance in favour of SWT2. These results clearly confirm the superior performance of the invention for robust text-dependent speaker verification.

| Method | Average EER Based on Single Digits | EER Based on a Combination of all 10 Digits |
|---|---|---|
| UCN | 7.17 | 0.41 |
| SWT2 | 5.92 | 0.19 |

Table 1. Equal Error rates (%) for SWT2 and UCN in speaker verification experiments based on single digits and a combination of all ten digits.

Although the description so far has made reference to DTW techniques, the invention may be implemented using other modelling techniques such as Hidden Marker Models (HMMs). In this case, each utterance from an allowed speaker may be stored using single state, multi-model HMMs. Each state of the HMM represents a frame of the utterance and each mode represents a training utterance for the given allowed speaker.

The invention may also be used in the recognition of patterns other than speech for instance image recognition. In this case reference data is stored for each of the images to be recognised. At least one of the images has at least two instances of reference data representing the image. During recognition, successive segments of an unknown input signal are compared to the reference data and, for that or those images that have more than one instance of reference data, a composite comparison result is formed from the best scoring segments of the reference data. A weighting factor may be applied as described with reference to the speaker recognition implementation.

What is claimed is:

1. A method of speaker recognition comprising comparing an input signal representing speech from an unknown speaker with reference data representing speech from each of a plurality of pre-defined speakers, at least one of the pre-defined speakers being represented by at least two instances of reference data, the method comprising:

comparing successive segments of the input signal with successive segments of the reference data and generating a comparison result for each successive segment, and, for each pre-defined speaker having at least two instances of reference data, the comparison result for the closest matching segment of reference data for each segment of the input signal are recorded to produce a composite comparison result for each successive segment for the said pre-defined speaker, and identifying the unknown speaker on the basis of the composite comparison results.

2. A method according to claim 1 wherein the length of each instance of reference data is made equal to the mean length of the instances of reference data.

3. A method according to claim 2 wherein the length of the input signal is made equal to the mean length of the reference data before the comparison step is carried out.

4. A method according to claim 1 wherein each comparison result for each segment is weighted, prior to the calculation of the comparison result, in accordance with an estimated level of mismatch associated with the segment and the reference data.

5. A method according to claim 4 wherein the comparison score D is the average of the weighted score for each closest matching segment i.e.

$$D = \frac{1}{N}\sum_{n=1}^{N} w(n)d(n) \qquad (1)$$

where N is the number of segments, w(n) is the weighting factor for the nth segment and d(n) is the comparison result for the nth segment.

6. A method according to claim 5 wherein $$w(n) = \left[\frac{1}{J}\sum_{j=1}^{J} d'_j(n)\right]^{-1} \qquad (2)$$

where J is the number of allowed speakers used to determine the weighting factor and d'$_j$(n) is the comparison result for the nth segment of the input signal and the nth segment of the jth model.

7. A method according to claim 6 for verifying the identity of an unknown speaker, wherein the unknown speaker provides information relating to a claimed identity and the comparison result for the reference data associated with the information is compared to the comparison results for the other reference data and, if a criterion is met, the unknown speaker is verified as the speaker associated with the information.

8. A method according to claim 7 wherein the weighting factor is dependent on the comparison results for J+1 allowed speakers, where J+1 speakers represent the identified speaker and the J speakers having comparison scores closest to that of the identified speaker.

9. A method according to claim 1 wherein the input signal is divided into frames and the segments are one frame in length.

10. Speaker recognition apparatus comprising:
- an input for receiving an input signal representing speech from an unknown speaker;
- reference data representing speech from each of a plurality of pre-defined speakers, at least one of the pre-defined speakers being represented by at least two instances of reference data, the method comprising:
  - comparing means for comparing successive segments of the input signal with successive segments of the reference data and generating a comparison result for each successive segment,
  - decision means for generating, for each pre-defined pattern having at least two instances of reference data, a composite comparison result for the said pre-defined speaker from the comparison result for the closest matching segment of reference data for each segment of the input signal, and for identifying the unknown speaker on the basis of the composite comparison results.

11. Apparatus according to claim 10 further comprising linear adjustment means for adjusting the length of each instance of reference data to be equal to the mean length of the instances of reference data.

12. Apparatus according to claim 11 wherein linear adjustment means is arranged also to adjust the length of the input signal to be equal to the mean length of the instances of reference data before the comparison step is carried out.

13. Apparatus according to claim 10 wherein each comparison result for each segment is weighted, prior to the calculation of the comparison result, in accordance with an estimated level of mismatch associated with the segment and the reference data.

14. Apparatus according to 13 wherein the comparison result D is the average of the weighted result for each closest matching segment i.e.

$$D = \frac{1}{N}\sum_{n=1}^{N} w(n)d(n) \qquad (1)$$

where N is the number of segments, w(n) is the weighting factor for the nth segment and d(n) is the comparison result for the nth segment.

15. Apparatus according to claim 14 wherein $$w(n) = \left[\frac{1}{J}\sum_{j=1}^{J} d'_j(n)\right]^{-1} \qquad (2)$$

where J is the number of pre-determined patterns used to determine the weighting factor and d'j(n) is the comparison result for the nth segment of the input signal and the nth segment of the jth model.

16. Apparatus according to claim 15 for verifying the identity of an unknown speaker, wherein the apparatus includes an input for receiving information relating to a claimed identity of the unknown speaker and the comparison result for the speaker corresponding to the claimed identity is compared to the other comparison scores and, if a criterion is met, the unknown speaker is verified as the corresponding speaker.

17. Apparatus method according to claim 16 wherein the weighting factor is dependent on the comparison results for J+1 allowed speakers, where J+1 speakers represent the identified speaker and the J speakers having comparison scores closest to that of the identified speaker.

18. Apparatus according to claim 10 wherein the input signal is divided into frames, each frame representing a portion of an unknown utterance, and the segments are one frame in length.

* * * * *